United States Patent [19]

Pfenninger et al.

[11] Patent Number: 4,660,651
[45] Date of Patent: Apr. 28, 1987

[54] HIGHLY FLEXIBLE, FOLDABLE DRILL FOR UNIFORM DEPTH SEED DEPOSIT

[75] Inventors: Billy J. Pfenninger, Hutchinson; David R. Smith, Hesston; David H. Weast, Hutchinson, all of Kans.

[73] Assignee: Krause Plow Corporation, Hutchinson, Kans.

[21] Appl. No.: 749,827

[22] Filed: Jun. 28, 1985

[51] Int. Cl.[4] .................... A01B 49/06; A01B 63/114; A01C 5/00
[52] U.S. Cl. .................... 172/311; 172/484; 172/500; 111/56; 111/85
[58] Field of Search .............. 172/311, 456, 457, 776, 172/459, 310, 500, 117, 462; 280/411 A, 411 R, 656; 111/55, 56, 60, 69, 52, 84, 85, 52 WT

[56] References Cited

U.S. PATENT DOCUMENTS

| | | | |
|---|---|---|---|
| 3,654,999 | 4/1972 | Fischer | 172/311 |
| 3,705,560 | 12/1972 | Lappin | 111/52 X |
| 3,785,441 | 1/1974 | Sosalia | 172/311 |
| 3,982,773 | 9/1976 | Stufflebeam et al. | 172/456 X |
| 3,986,464 | 10/1976 | Uppiano | 172/311 X |
| 4,042,044 | 8/1977 | Honnold | 172/311 |
| 4,050,523 | 9/1977 | Poland | 172/459 X |
| 4,058,170 | 11/1977 | Ankenman et al. | 172/456 X |
| 4,077,478 | 3/1978 | Neukom | 172/500 X |
| 4,117,892 | 10/1978 | Dietrich, Sr. et al. | 172/311 |
| 4,126,187 | 11/1978 | Schreiner et al. | 172/311 |
| 4,171,022 | 10/1979 | Applequist | 172/311 |
| 4,241,674 | 12/1980 | Mellinger | 111/52 |
| 4,338,872 | 7/1982 | Decker | 111/85 X |
| 4,425,857 | 1/1984 | Lienemann et al. | 111/85 |
| 4,479,549 | 10/1984 | Fegley | 172/311 X |
| 4,479,554 | 10/1984 | Kueker | 172/311 |
| 4,496,004 | 1/1985 | Frase et al. | 172/311 |
| 4,504,076 | 3/1985 | Bedney | 172/311 X |
| 4,506,609 | 3/1985 | Fuss et al. | 172/417 X |
| 4,519,460 | 5/1985 | Gust | 111/85 X |
| 4,576,238 | 3/1986 | Spencer | 172/311 |

FOREIGN PATENT DOCUMENTS 2483731 12/1981 France .................... 172/311

*Primary Examiner*—Richard J. Johnson
*Assistant Examiner*—Terrence L. B. Brown
*Attorney, Agent, or Firm*—Schmidt, Johnson, Hovey & Williams

[57] ABSTRACT

In a drill, there is provided the combination of a pair of foldable pivot frames to each of which is attached a wheeled wing frame for up and down swinging movement, together with a tongue assembly for effecting the folding action, as well as a subframe for each wing made up of a T-frame and a hoe frame especially adapted for opening seed-receiving furrows and pressing the soil in each seeded furrow.

14 Claims, 20 Drawing Figures

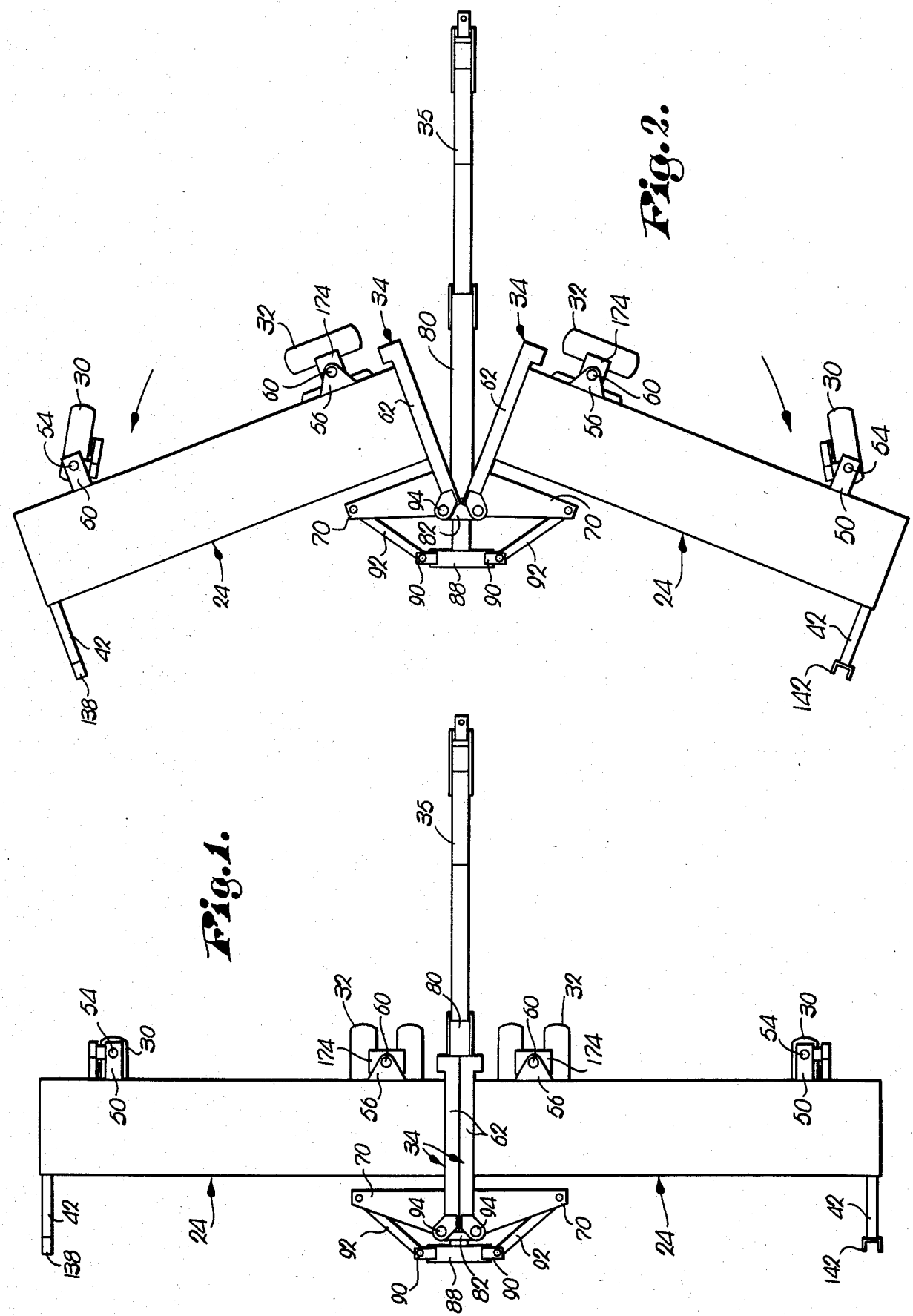

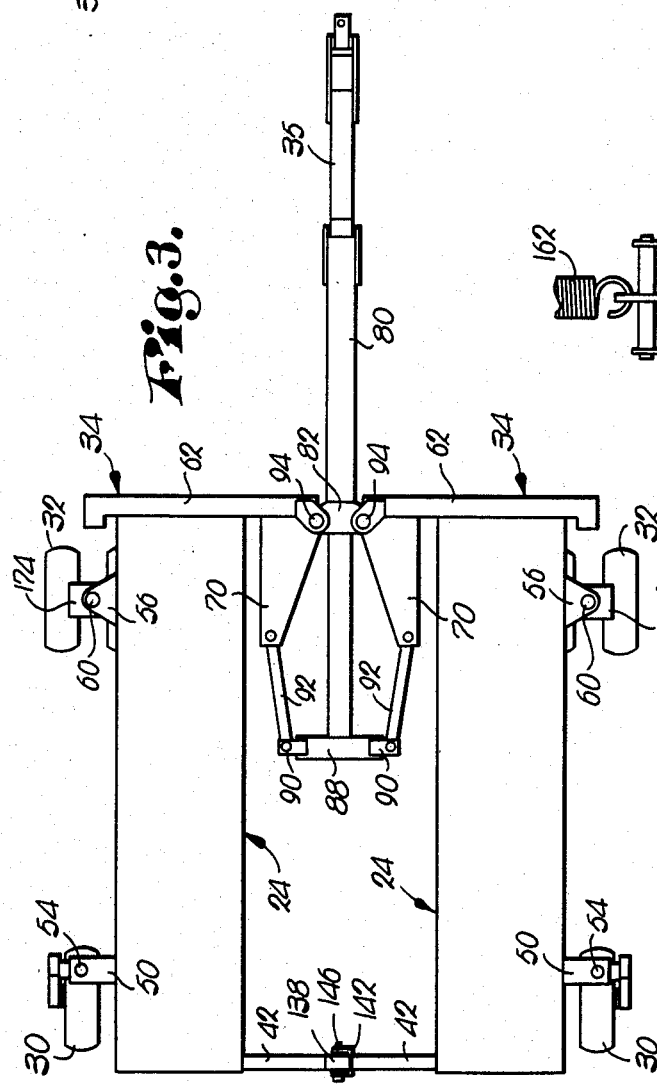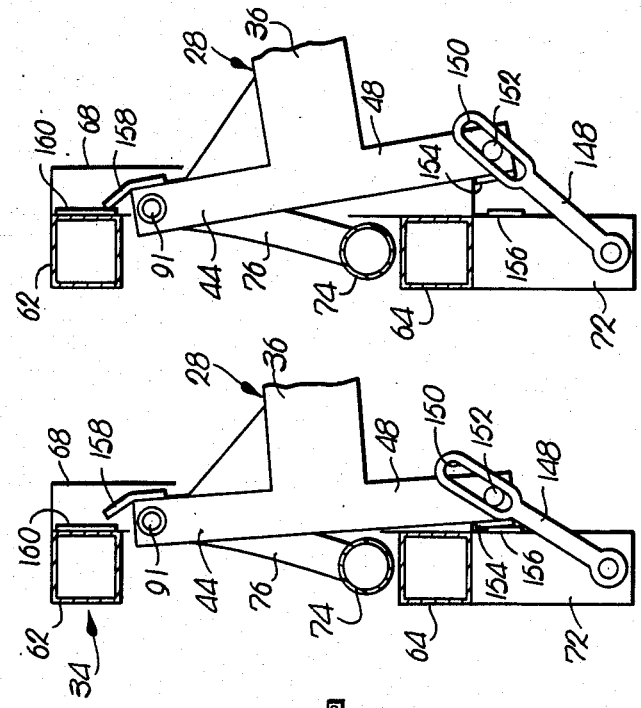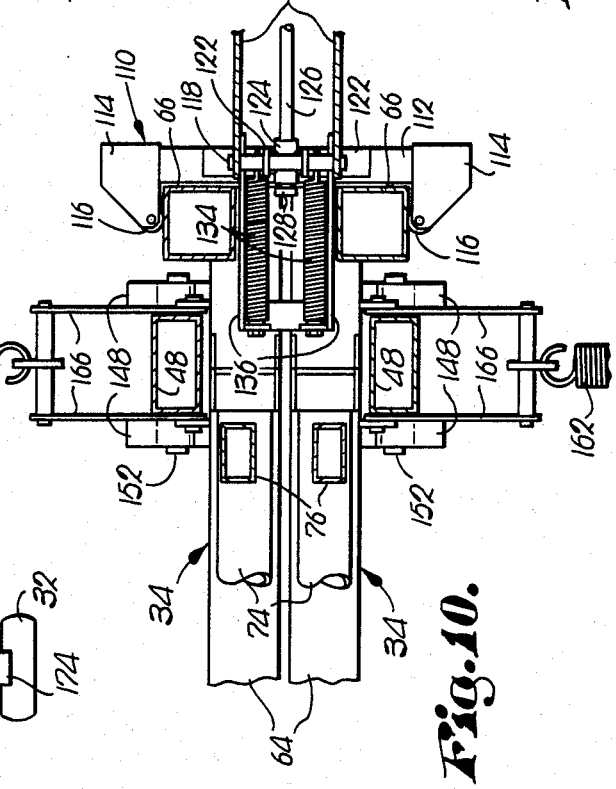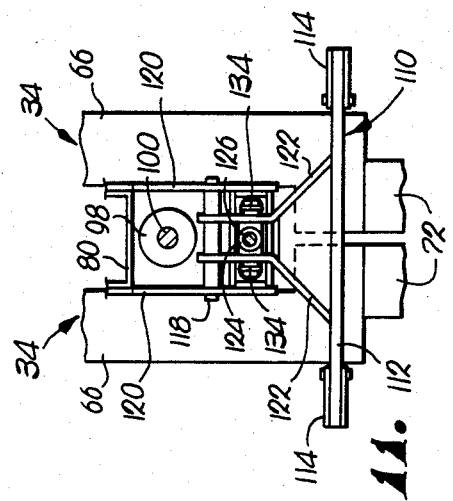

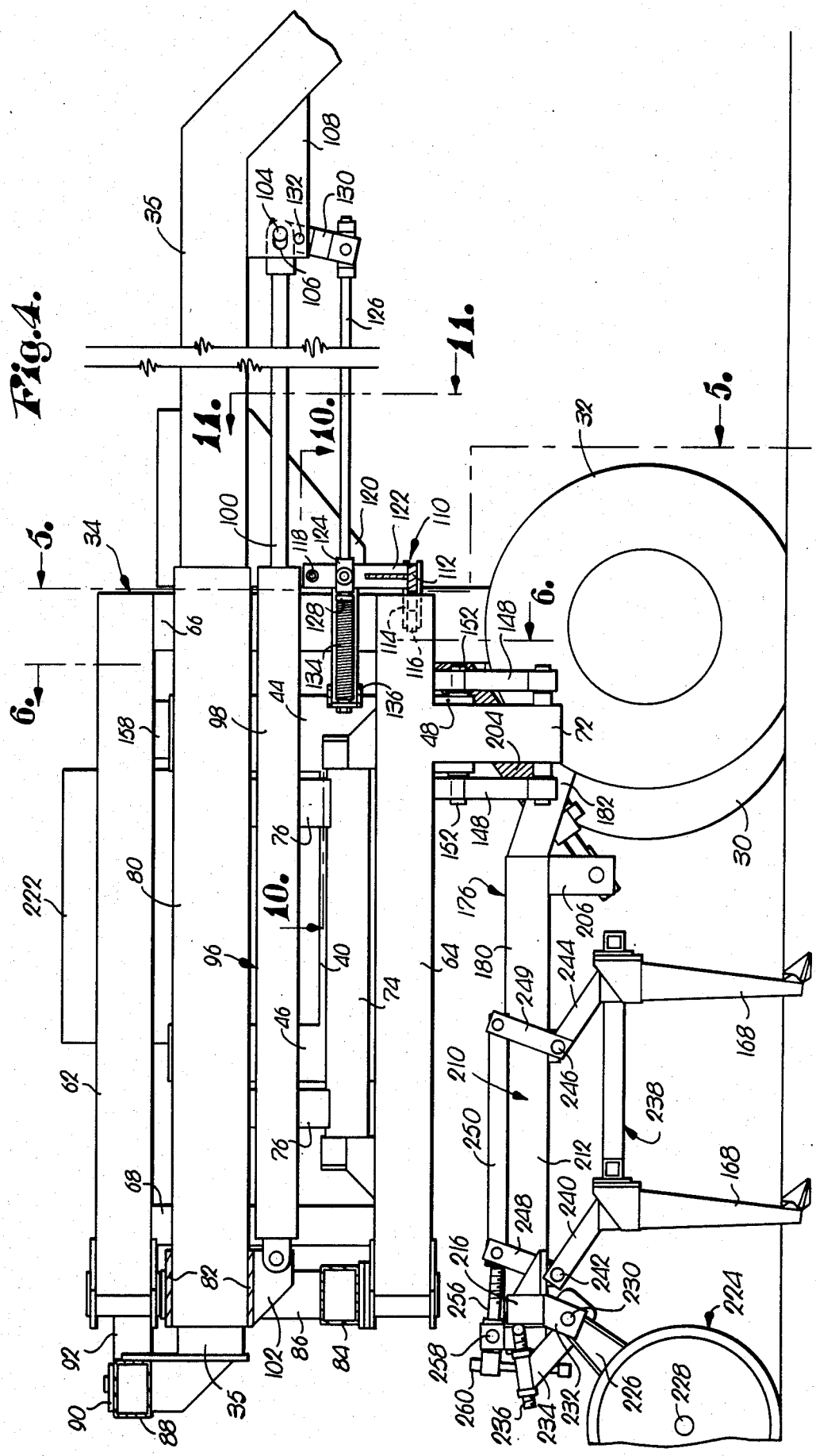

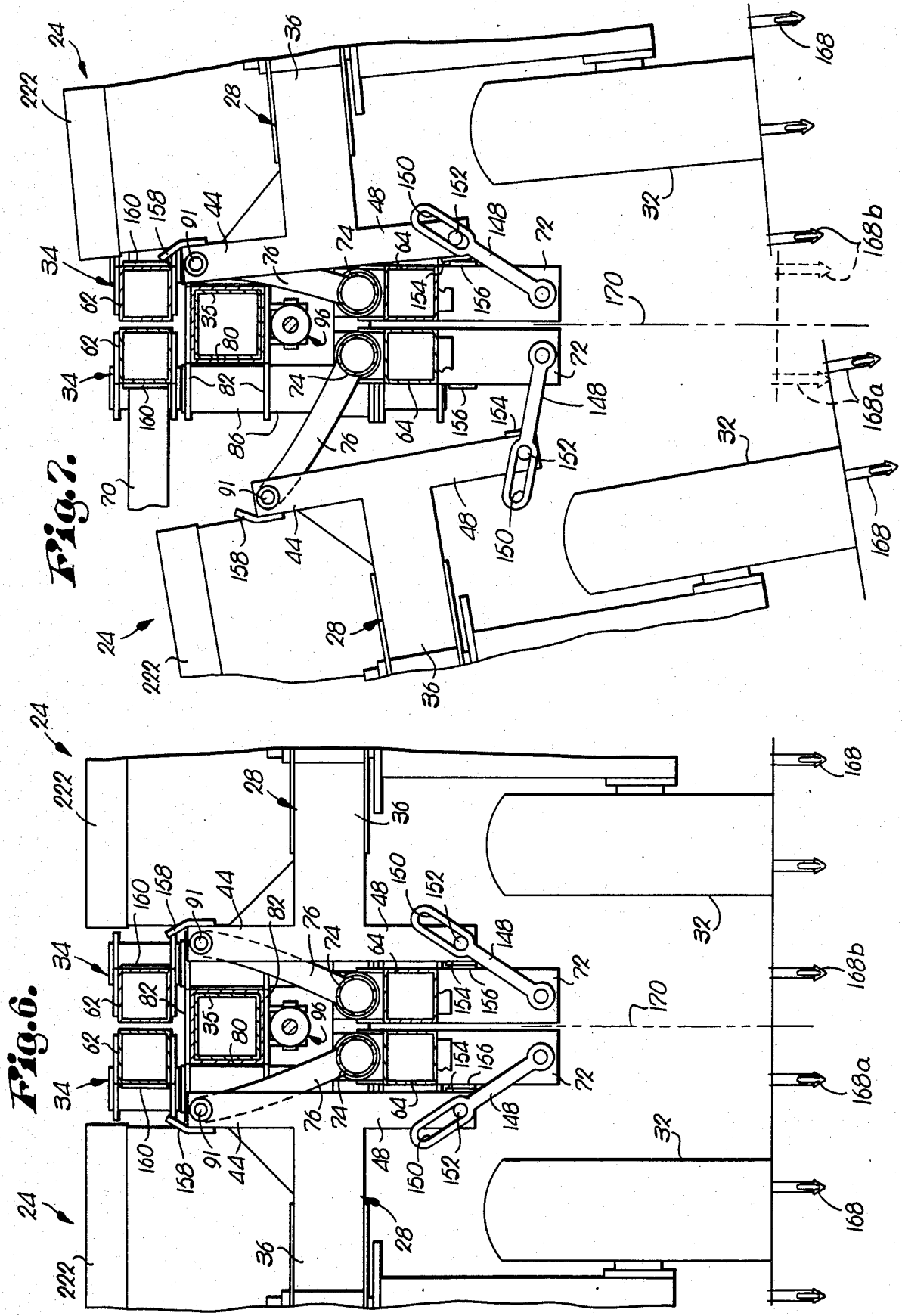

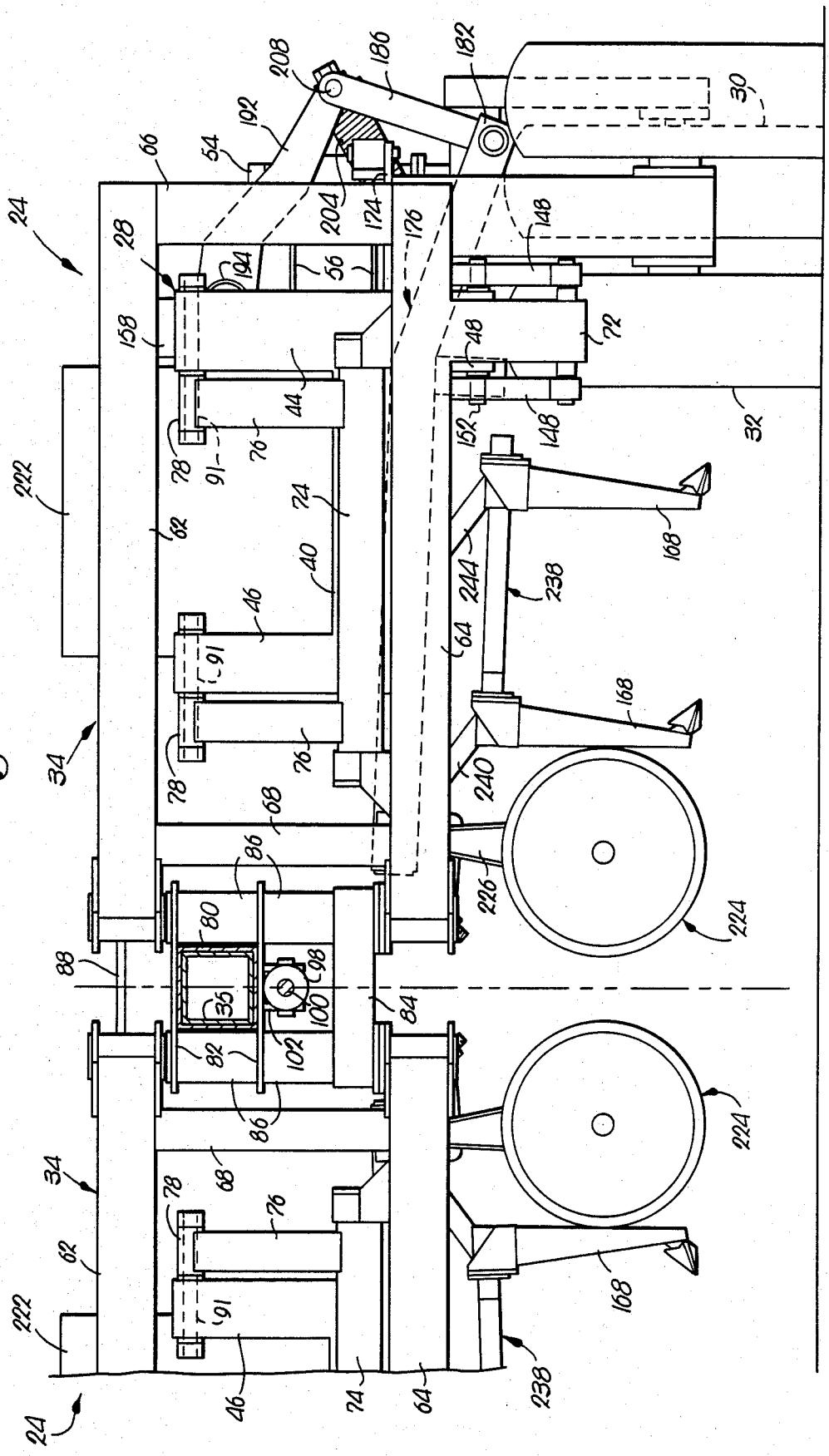

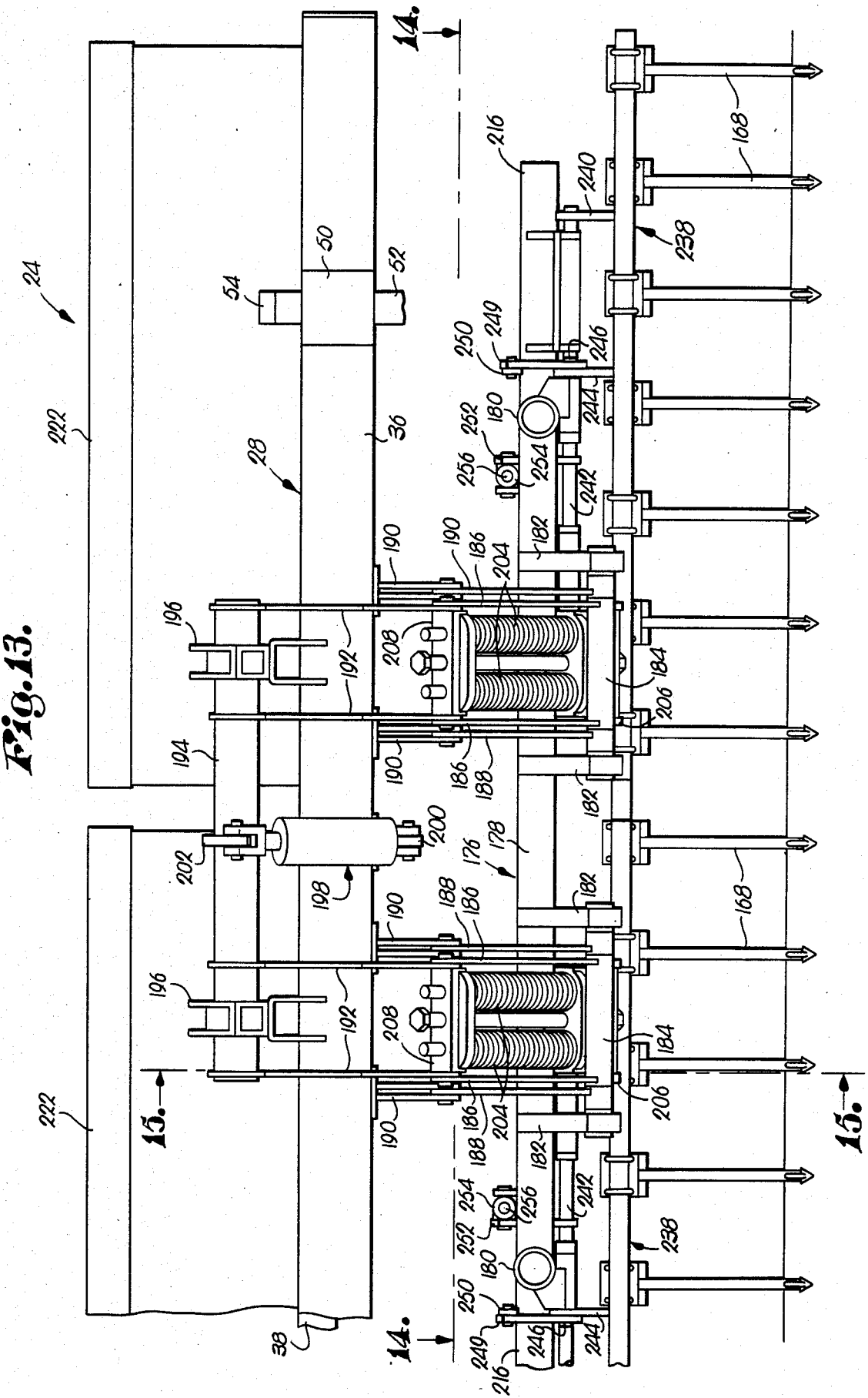

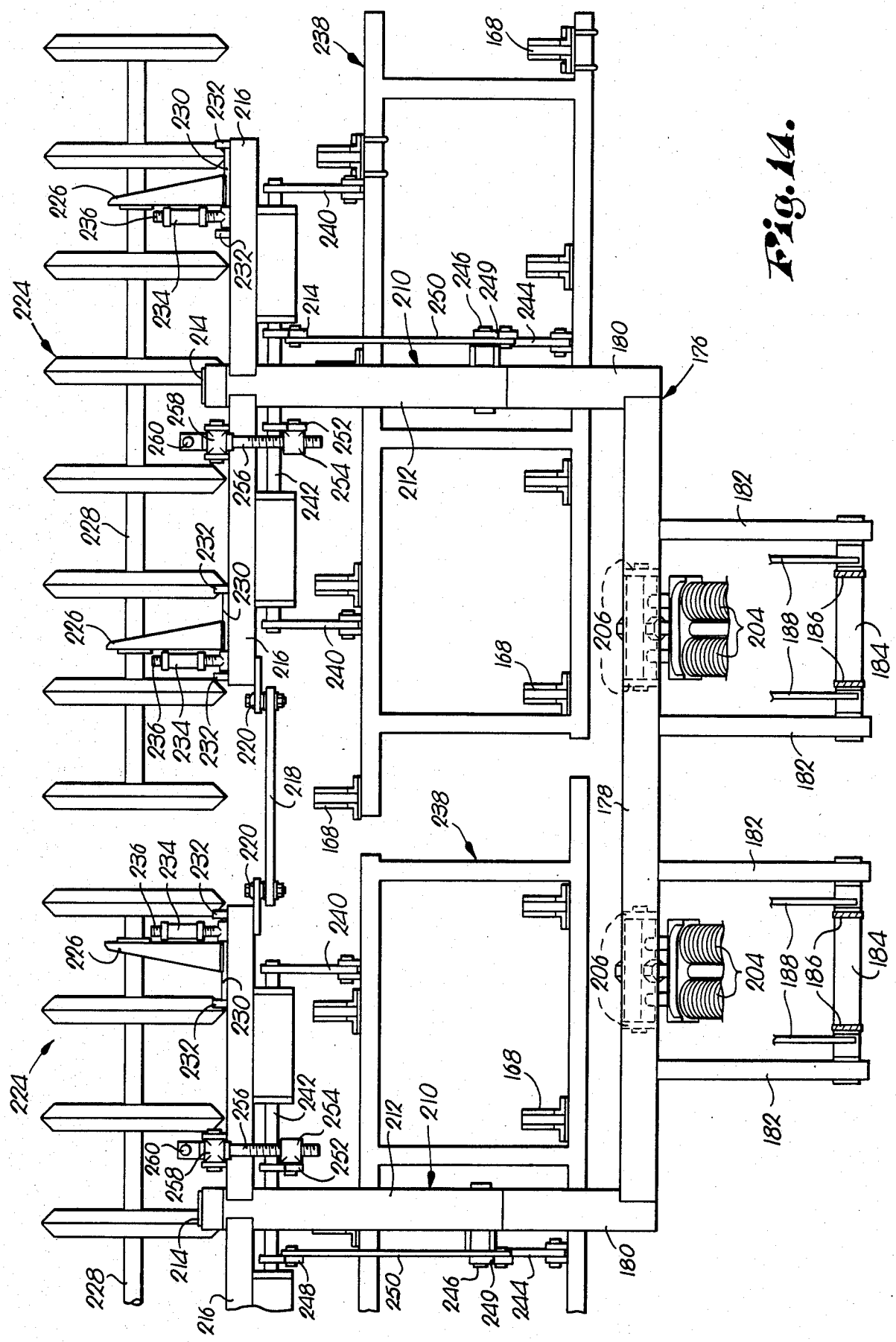

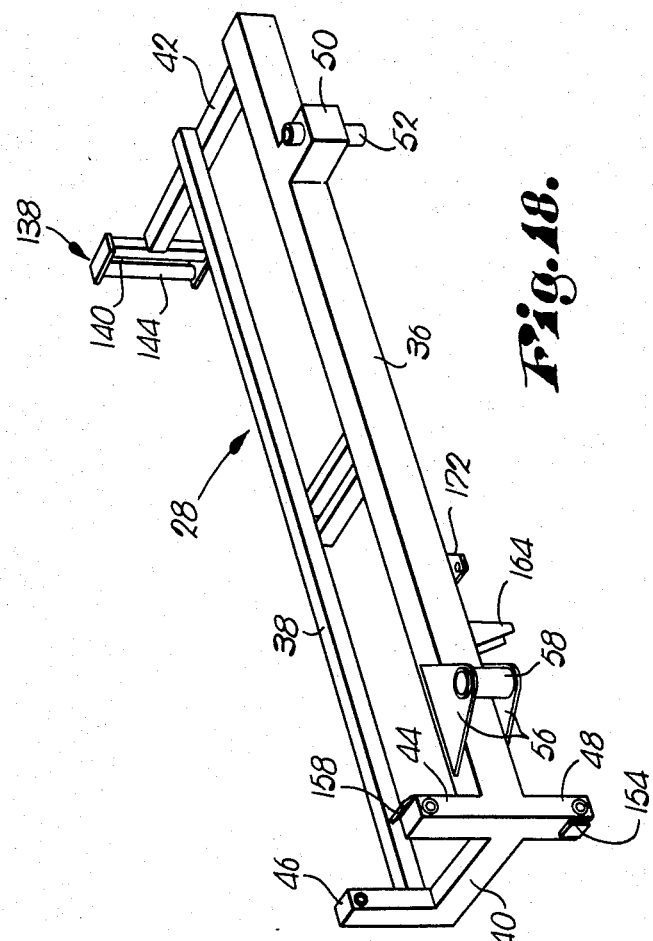
Fig. 18.
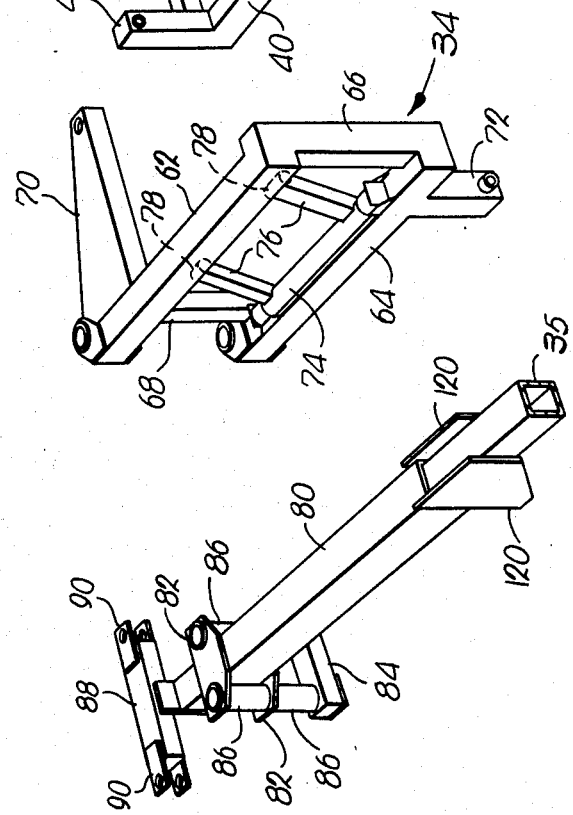
Fig. 19.
Fig. 20.

HIGHLY FLEXIBLE, FOLDABLE DRILL FOR UNIFORM DEPTH SEED DEPOSIT

BACKGROUND OF THE INVENTION

Field of the Invention

The present invention relates to an agricultural implement having wings which are not only foldable but floatable through use of supporting pivot frames, with the working tool frames also swingably coupled with the wings.

Present-day large acreage farming demands the availability of tillage, seeding and other multi-foot work machines capable of cutting labor and saving time. This necessitates the use of wings which are so long, heavy and bulky as to not only require good flotation response over uneven ground contours but foldability for travel to and from field use. Moreover, there must still be provided tool-supporting structures which are fully capable of proper operation notwithstanding terrain unevenness.

SUMMARY OF THE INVENTION

The foregoing problems are solved by our instant invention largely because of the use of pivot frames to which the wing frames are attached for up and down swinging movement. The pivot frames, normally latched together, are, in turn, foldable such as to permit conversion of the wings from their expanded condition spread out on each side to an appreciably narrower wing-back position.

Each wing frame tows tool supports which also rise and fall as the lay of the land dictates, such supports being mounted in a manner to permit a raised, out-of-the-way underfold when the wings are to be collapsed to their over-the-road travel positions.

In the drawings:

FIG. 1 is a schematic top plan view of a foldable drill made in accordance with our present invention shown in its unfolded, operable, field position;

FIG. 2 is a view similar to FIG. 1 showing the drill partially folded;

FIG. 3 is a view similar to FIGS. 1 and 2 showing the drill fully folded in its over-the-road position;

FIG. 4 is an enlarged, central, vertical, cross-sectional view extending fore and aft of the drill when in the field position shown in FIG. 1, essentially illustrating, therefore, the left half of the drill when looking forwardly;

FIG. 6 is a fragmentary cross-sectional view taken substantially on line 6—6 of FIG. 4;

FIG. 7 is a view similar to FIG. 6 showing the left half of the drill titled upwardly and the right half of the drill tilted downwardly;

FIG. 8 is a fragmentary, detailed, schematic, cross-sectional view similar to FIGS. 6 and 7 showing another upwardly tilted position of the left half of the drill;

FIG. 9 is a view similar to FIG. 8 showing the third upward tilt of the left half of the drill;

Figure 15:
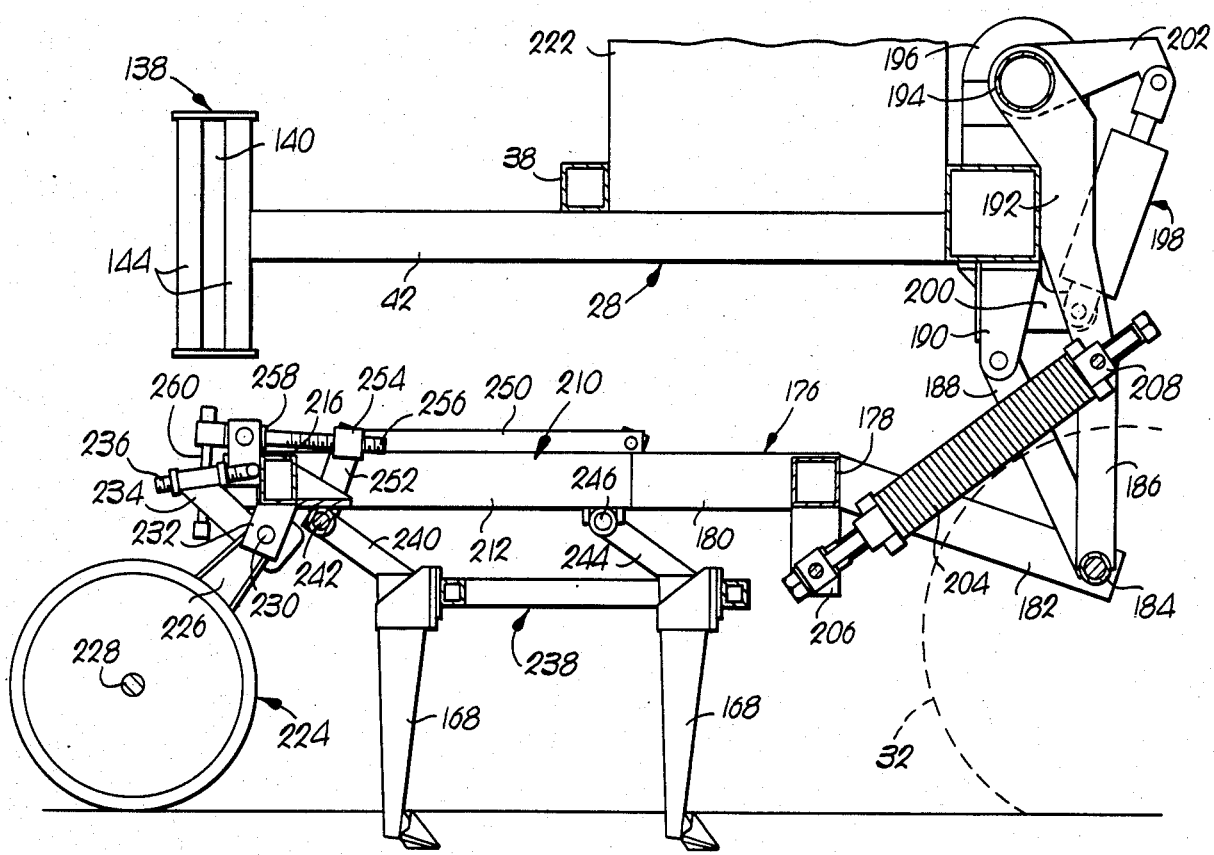
Figure 16:
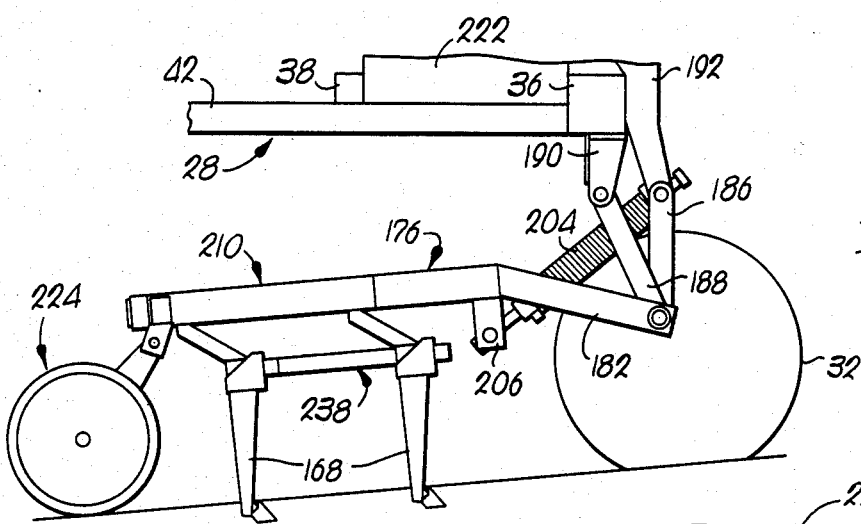
Figure 17:
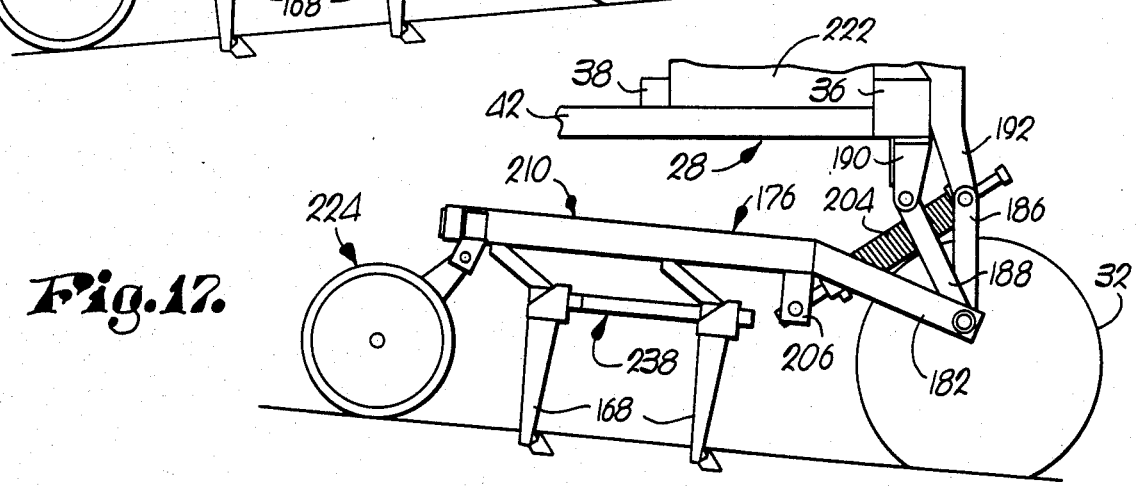

FIGS. 10 and 11 are fragmentary, cross-sectional views taken on lines 10—10 and 11—11 respectively of FIG. 4;

FIG. 12 is an enlarged, fragmentary, front elevational view, partially in section of the drill when in the folded position shown in FIG. 3, with the tools inoperably raised for over-the-road travel;

FIG. 13 is an enlarged fragmentary front elevational view of the left half of the drill when in the field position shown in FIG. 1 with the tools in the lowered field position, the outboard, caster wheel assembly of such left half being broken away and not illustrated;

FIGS. 14 and 15 are fragmentary cross-sectional views taken on lines 14—14 and 15—15 respectively of FIG. 13;

FIGS. 16 and 17 are fragmentary, schematic views similar to FIG. 15, but showing the positions of the tools and associated components when the drill traverses inclined topographies different from the ground level illustrated in FIG. 15;

FIG. 18 is a top perspective view of the left wing frame;

FIG. 19 is a top perspective view of the left pivot frame; and

FIG. 20 is a top perspective view of the sleeve which reciprocates on the tongue.

DESCRIPTION OF THE PREFERRED EMBODIMENT

Figure 5:
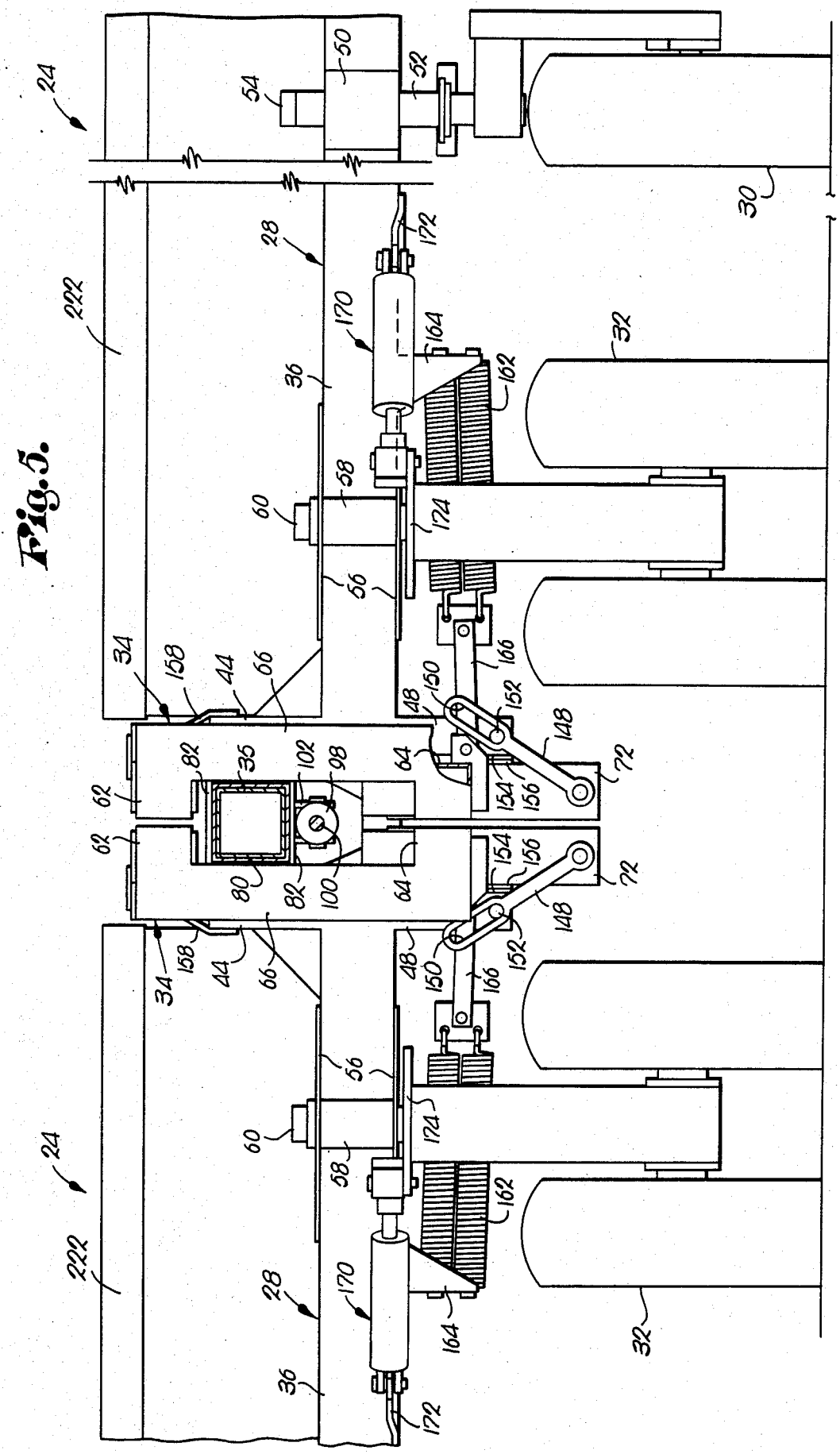
FIG. 5 is a fragmentary, cross-sectional view taken on irregular line 5—5 of FIG. 4.

The farm implement shown in the drawings, adapted to be towed by a tractor, includes a pair of identical, elongated wings 24 namely, a left and a right wing, normally in end-to-end relationship (FIG. 1) but foldable rearwardly for over-the-road travel (FIG. 3) disposing their longitudinal axes parallel to the normal path of travel of the implement. Moreover, the wings 24 are capable of floating up and down over uneven terrain, swinging about fore-to-aft axes at their inner ends (FIGS. 5–7).

The Wing Frames

Each wing 24 includes a wing frame 28 (FIG. 18) supported by an outboard wheel 30 and a pair of double inboard wheels 32 (FIGS. 1–3) and, to permit folding, each frame 28 carries a pivot frame 34 (FIG. 19) at its inner end operably coupled with the tail end of a tongue 35 (FIGS. 1–3).

Each frame 28 has a front beam 36, a rear beam 38, an inner cross bar 40 and an outer cross bar 42. At the bar 40, the frame 28 has a pair of spaced, upstanding posts 44 and 46, and an extension 48 depends from the inner end of the beam 36 adjacent front post 44. A stud 50 projecting forwardly from the beam 36 adjacent the bar 42 has an upstanding tube 52 which rotatably receives vertical shank 54 of the corresponding outer wheel 30. Plates 56 on the beam 36 adjacent the post 44 and the extensions 48 have a pipe 58 which rotatably receives upstanding shank 60 of the corresponding inner double wheels 32.

The Pivot Frames

Each frame 34 (FIG. 19) is provided with an upper framepiece 62, a lower framepiece 64, an upstanding front connector 66, a rear connector 68 and a lateral projection 70 rigid to the framepiece 62 adjacent the connector 68. The framepiece 64 has a depending protuberance 72 adjacent the connector 66 and a rotatable shaft 74 thereupon having a pair of radial arms or links 76 each provided with a short cross tube 78 rigid to its upper end.

The Tongue Assembly

In FIG. 20, an elongated, tongue sleeve 80 receives the tongue 35 for reciprocation of the sleeve 80 along the longitudinal axis of the tongue 35, and a pair of vertically spaced straps 82 are rigid to the sleeve 80 adjacent its rearmost end. A cross bar 84 is spaced below the sleeve 80 and tubular spacers 86 interconnect the straps 82 and the cross bar 84. A stem 88, rigid to the tongue 35, is provided with spaced, perforated forks 90 at its outer ends.

The tubes 78 receive pintles 91 which connect the arms 76 with the upper ends of the posts 44 and 46 (FIG. 12). The pintles 91 which connect the upper ends of the rear posts 46 with the tubes 78 on the rear arms 76 are best illustrated in FIG. 12. Links 92 (FIG. 1) pivotally connect the projections 70 with corresponding forks 90. Upstanding pivot pins 94 (FIGS. 1, 2 and 3) pass through the spacers 86 as well as through the corresponding framepieces 62, 64 at the rearmost ends of the latter. Hence, the frames 34 are attached to the sleeve 80 for swinging movement about the vertical axes of the pins 94 and the frames 28 are attached to the frames 34 for up and down swinging movement about the horizontal axes of the tubes 78 according to the contour of the terrain traversed by the wheels 30, 32. The frames 34 are caused to swing upon reciprocation of the sleeve 80 by virtue of the projections 70 rigid to the frames 34 and the swinging of the links 92 relative to the projections 70 and relative to the forks 90 carried by the tongue 35.

Tongue Sleeve Actuation

The sleeve 80 shown in FIG. 20, and elsewhere in the drawings, is reciprocated fore and aft along the tongue 35 by a fluid pressure piston and cylinder unit or assembly 96 (FIG. 4) which includes a cylinder 98 underlying the sleeve 80 and a piston rod 100 underlying the tongue 35 and extending forwardly of the cylinder 98. The rear end of the cylinder 98 is attached to spaced lugs 102 rigid to and depending from the lower strap 82 (FIGS. 4–7, 11 and 12). The forwardmost end of the rod 100 has a cross pin 104 which passes through slots 106 is spaced lugs 108 rigid to and depending from the tongue 35 (FIG. 4).

Latch for Pivot Frames

Associated with the piston rod 100, for holding the pivot frames 34 and, therefore, the wings 24 in their normal operating positions shown in FIGS. 1, 5–7, 10 and 11, is a swingable, U-shaped, spring-loaded latch 110 (FIGS. 4, 10 and 11). The latch 110 includes a horizontal crosshead 112 disposed forwardly of the connectors 66 adjacent the frame pieces 64 and provided with rearwardly extending ears 114 at its ends, the ears 114 having the connectors 66 normally clamped therebetween. Rollers 116 on the ears 114 ride along the connectors 66 transversely of the latter as the latch 110 is swung fore and aft about a horizontal pivot pin 118. The pin 118 is carried by plates 120 secured rigidly to the sleeve 80 at its forwardmost end. The crosshead 112 is suspended from the pin 118 by a pair of hangers 122 which pivotally receive a cross-shaped knuckle 124 therebetween.

An actuator rod 126 beneath the piston rod 100 extends slidably through the knuckle 124, terminates in a rear knob 128 and has its forward end pivotally coupled with a small lever 130. A pivot pin 132 attaches the lever 130 to the lugs 108 and the cross pin 104 extends through the lever 130 above the pin 132. A pair of springs 134 for yieldably biasing the latch 110 toward the connectors 66 have their forward ends coupled with the hangers 122. The rear ends of the springs 134 are supported by brackets 136 rigid to the plates 120 and extending rearwardly from the latter.

Interlock for Wing Frames

When the wings 24 are folded into parallelism (FIG. 3) they are interlocked to prevent them from spreading apart back to the positions shown in FIG. 1 in a direction opposite to the arrows shown in FIG. 2. To this end, each cross bar 42 is extended beyond its beam 38. As depicted also in FIGS. 15 and 18, the bar 42 on the left hand frame 28 terminates in an upstanding member 138 provided with a vertical slot 140. The extended bar 42 of the right hand frame 28 terminates in a clevis 142 adapted to receive a post 144 forming a part of the member 138. A clevis pin 146 extends through the slot 140 for up and down movement therealong when the frames 28 are thus interlocked as illustrated in FIG. 3.

Wing Flotation

With reference to FIGS. 5–9, a four point linkage is provided in conjunction with the upper arms 76 by lower links 148 swingably attached to each of the protuberances 72 respectively of the pivot frames 34. Each link 148 has an elongated slot 150 receiving studs 152 on proximal extensions 48 of the wing frames 28.

In the normal positions of the frames 28 and 34 shown in FIGS. 5 and 6, while the implement is operating over level terrain, pads 154 and 156 on extensions 48 and protuberances 72 respectively, are in flat, face-to-face interengagement, whereas fingers 158, rigid to the upper ends of posts 44 are spaced from similar pads 160 on the framepieces 62.

Up and down swinging movement of the wings 24 in response to uneven terrain, about pintles 91 and shafts 74 is resisted by springs 162 (FIG. 5). The springs 162 also tend to keep the wings 24 closely adjacent the sleeve 80. Moreover, the tendency of the wings 24 to swing rearwardly as the wheels 30 and 32 encounter ground resistance to forward travel is, in turn resisted by the springs 162, operating, therefore, to keep the wings 24 aligned. The springs 162 are coupled between brackets 164 (see also FIG. 18) depending from the beams 36 of the frames 28 and links 166 pivotally attached to the frame pieces 64 of the frames 34.

Comparing FIGS. 5 and 6 with FIGS. 7–9, as one of the beams 36 commences to swing upwardly (FIG. 8) the pad 154 slides along the pad 156, the stud 152 moves away from the bottom of the slot 150 and the finger 158 approaches the pad 160. Note the tilt of the post 44 and the extension 48 with but slight swinging of the arm 76 and the link 148.

This same beam 36 is shown on the right in FIG. 7 swung upwardly still higher with the finger 158 moving into contact with the pad 160, and with the pads 154 and 156 still interengaged. Viewing now FIG. 9, when the beam 36 swings still higher, the pad 154 moves away from the pad 156 and the stud 152 moves closer to the upper end of the slot 150 as the finger 158 fulcrums on the pad 160.

FIG. 7 also demonstrates the action when the wings 24 swing downwardly. At this juncture it is to be noted that the implement carries a plurality of furrow opening hoes 168 to the hereinafter more fully explained in connection with FIGS. 4, 6, 7 and 12–17. The center line of the implement is designated 170 in FIGS. 5 and 7 in relation to proximal innermost hoes 168a and 168b.

When the left beam 36 (viewing FIG. 7) swings downwardly, the swinging arms 76 and links 148 effect a movement of the finger 158 farther away from the pad 160 and a substantial movement of the pad 154 away from the pad 156, while the stud 152 remains bottomed in the slot 150. This results in keeping the hoes 168a from crossing centerline 170 and away from the hoes 168b even if, at the same time, the right beam 36 should also tilt downwardly to the same extent. That is to say, even though the hoes 168a and 168b move toward and away from the line 170 during up and down swinging of the wings 24 over uneven terrain, row spacing remains substantially uniform.

Inboard Wheel Controls

As a part of the hydraulic circuit (not shown) for the assembly 96 of FIG. 4, there is a pressurized fluid piston and cylinder assembly 170 provided for each of the inboard, double wheels 32 for rotating the shanks 60 of the wheels 32 (FIG. 5). The beams 36 have ears 172 (see also FIG. 18) which pivotally receive the cylinders of the assemblies 170, and plates 174 rigid to the shanks 60 pivotally receive the piston rods of the assemblies 170. As a fluid flow control valve (not shown) accessible to the tractor operator is actuated to reciprocate the cylinder 98, the rod of the assembly 170 is reciprocated at the same time during movement of the wings 24 from the position shown in FIG. 3 and vice versa. Note by comparing FIGS. 1, 2 and 3 the castering of the wheels 30 and the revolving of the wheels 32 about their vertical shanks 60.

The Subframes

With reference essentially to Figs. 13–17, each wing 24 is provided with a U-shaped subframe 176 having a leading bight 178 and a pair of rearwardly extending, tubular, end legs 180. Two pairs of arms 182 are rigidly secured to and extend downwardly and forwardly from the bight 178, each pair being joined at the forward, lower ends by rotatable cross elements 184. Rigidly secured to each element 184 is a pair of upstanding, inner links 186 and a pair of upstanding outer links 188. The upper ends of the links 188 are pivotally connected with ears 190 rigid to and depending from the beams 36 of the wing frames 28, whereas the upper ends of the links 186 are pivotally connected to cranks 192 depending from and rigid to a horizontal torque tube 194 above and parallel with the beam 36 of the wing frame 28. Brackets 196, rigid to the beam 36 rotatably support the tube 194.

Also within the hydraulic circuit above referred to is still another fluid pressure piston and cylinder assembly 198 for each wing 24 respectively controlled by the tractor operator through use of suitable valving. Each assembly 198 pivotally interconnects a bracket 200 rigid to the corresponding beam 36 and a second crank 202 rigid to the tube 194 and extending forwardly therefrom.

Extending downwardly and rearwardly from the lower ends of each pair of cranks 192 is a pair of springs 204. The springs 204 are operably supported by hangers 206 depending from the bight 178 and by a swingable coupling 208 associated with the pivots between links 186 and cranks 192, all substantially in a well-known manner.

The "T" Frames

Rearwardly of each leg 180 of each wing 24 is a T-shaped frame 210 each having a tubular stem 212 abutting and aligned with a corresponding leg 180. A shaft 214 within each leg 180 and rigidly secured thereto extends through the corresponding stem 212 for rotatably supporting the latter. Accordingly, a pair of laterals 216 extending oppositely from each stem 212 respectively and fixed thereto are free to swing up and down about the axes of the shafts 214. The pairs of frames 210 are interconnected by a bar 218 coupled with proximal innermost laterals 216 by universal joints 220.

The frames 210 are related to seed boxes 222 carried by the frames 28 from which seed is dropped into furrows opened by the hoes 168 and then firmed up by gangs of press wheels 224 in trailing relation to the laterals 216. The press wheel gangs 224 are towed by devices 226 which receive their axles 228 and are pivoted at 230 to brackets 232 depending from the laterals 216. A number of arms 234 extending upwardly and rearwardly from the devices 226 receive screws 236 for adjusting the extent of upward movement of the press wheels 224, the inner heads of the screws 236 abutting the laterals 216.

The Hoe Frame

An open frame 238 from which the hoes 168 are suspended comprises a series of longitudinal and cross beams as best seen in FIG. 14. The frame 238 is, in turn, suspended from the frame 210 by a number of four point, parallel links. A pair of rear links 240 are rigid to a shaft 242 rotatably carried by laterals 216, and a front link 244 is rigid to a shaft 246 rotatably carried by the stem 212.

Cranks 248 and 249 secured to the shafts 242 and 246 are pivotally interconnected by a bar 250. Still another crank 252, rigid to the shaft 242, has a nut 254 thereon which receives a screw 256 that passes through a swivel 258 carried by the inner lateral 216. The screw 256 may be turned by use of a handle 260.

Operation

When the wings 24 are disposed as shown in FIG. 1, with each clevis 142 released from its member 138, with each latch 110 straddling its connectors 66 and with the front hitch of the tongue 35 pivotally connected with the drawbar of the tractor, the screws 236 are used to raise or lower the frames 210 until the frames 238 with connected hoes 168 are in a position such that a uniform seed depth is achieved between front and rear hoes 168 at a predetermined planting velocity when in the condition shown in FIG. 4. The assemblies 198 are operated to lower the subframes 176 from the position shown in FIG. 12, and depth of the hoes 168 determined by manipulation of the handle 260, all as seen in FIGS. 4, 13 and 15–17. When turns are made in the field without desire to form furrows, the hoes 168 are raised by use of the assemblies 198 such that all adjustments remain the same after the hoes 168 are again lowered into the ground.

As the wheels 30, 32 and 224 encountered upward and downward slopes in the terrain (compare FIGS. 15–17) the frame 176, and all associated components between the wheels 224 and links 186, 188 are free to swing up and down about the cross elements 184 as determined, of course, by the wheels 224 normally restrained by the abutment of the screws 236 against the laterals 216. The wheels 224 will swing down about the pivots 230 only during such rare instances when the hoes 168 encounter soil conditions which will not permit them to penetrate the ground at the intended depths. All the while, however, the springs 204 maintain a yieldable, downward bias on the subframes 176 to hold the hoes 168 in the ground as deeply as permitted by the wheels 224.

In conjunction with all of the above, changes in the terrain laterally of the centerline 170 are accommodated by the flotation of the wings 24 as above explained in reference to FIGS. 6–9, once again assuring substantially uniform furrow depth and row spacing under virtually all field conditions.

Noteworthy is the fact that each frame 38 and associated frame 210 are free to tilt up and down about the shaft 214 to permit proper seeding on uneven ground between corresponding wheels 30 and 32.

In preparation for leaving the field, it is important to compare FIGS. 4 and 12, for example, to appreciate that when the frames 238 are raised their movement is also forwardly such that the rearmost components of the implement (the gangs of press wheels 224) are "tucked in" beneath the connectors 68, avoiding interference with folding of the wings 24 about the center dash line shown in FIG. 12.

Finally, the assemblies 96 and 170 operated in conjunction as the wings 24 are moved in the direction of the arrows of FIG. 2 until folded as shown in FIG. 3. Hydraulic force within the cylinder 98 operates first as lost motion as the pin 104 is pulled to the rear end of the slots 106, swinging the lever 130 about the pin 132, thereby pulling the rod 126 forwardly. This causes the latch 110 to swing about the pivot 118 such that the ears 114 clear the connectors 66.

Thereupon, the cylinder 98 moves along the rod 100 toward the lugs 108, pulling the sleeve 80 therewith along the tongue 35 toward the tractor. The connectors 66 continue to be unlatched and, therefore free to separate as illustrated in FIG. 2. By the time the projections 70 have swung from their lateral positions shown in FIG. 1 to their rearwardly extended positions shown in FIG. 3, the operator will be able to interconnect the cross bars 42 through use of the clevis pin 146. All the while the wheels 30 and 32 become reoriented in relation to the wings 24, permitting over-the-road towing of the implement in its inoperative condition.

Not to be overlooked is the important fact that under the condition illustrated in FIG. 3, the wings 24 continue to be swingable up and down relative to the pivot frames 34 as the wheels 30 and 32 rise and fall. Moreover, one wing 24 may rise while the other wing 24 falls because of the slippages made possible by the clevis 142 and its pin 146 along the member 138.

We claim:

1. In a farm implement, the combination of:
a pair of elongated, upstanding pivot frames normally parallel with the path of travel of the implement, each frame being swingable about an upright axis;
releasable means latching the frames together in side-by-side relationship;
an assembly having structure for swinging the frames, when unlatched, to a position disposed in end-to-end relationship;
an elongated, normally horizontal, wheeled wing frame coupled with each pivot frame respectively,
the wing frames being normally in end-to-end relationship and disposed in a folded position trailing the pivot frames when the latter are in said end-to-end relationship;
means coupling the wing frames with the pivot frames for up and down swinging movement when the wing frames are end-to-end and when the same are folded; and
resilient means interposed between each wing frame and its pivot frame yieldably biasing the wing frames inwardly toward the pivot frames, maintaining the pivot frames side-by-side, and yieldably holding the wing frames in alignment when in end-to-end relationship.

2. In a farm implement, the combination of:
a pair of elongated, upstanding pivot frames normally parallel with the path of travel of the implement, each frame being swingable about an upright axis;
structure for swinging the frames to a position disposed in end-to-end relationship;
an elongated, normally horizontal, wheeled wing frame for each pivot frame respectively,
the wing frames being normally in end-to-end relationship and disposed in a folded position trailing the pivot frames when the latter are in said end-to-end relationship; and
four-bar linkage for each pivot frame respectively coupling the corresponding wing frame thereto for up and down swinging movement of the wing frames over uneven terrain,
each pivot frame having a protuberance depending therefrom and each wing frame having an extension depending therefrom, said extensions normally engaging corresponding protuberances, said linkages having means for moving the extensions away from the protuberances during downward swinging movement of the wing frames.

3. The invention of claim 2, said means for moving the extensions away from the protuberances being operable to maintain the engagement of the extensions with the protuberances during upward swinging movement of the wing frames.

4. The invention of claim 3, each wing frame having an upstanding front post and each pivot frame having an upper framepiece; and means on the posts establishing a fulcrum against corresponding framepieces during said upward swinging movement of the wing frames.

5. The invention of claim 3, each subframe having a T-frame pivotally mounted thereon and each T-frame having a tool frame suspended therefrom, there being a plurality of furrow-opening tools suspended from the tool frames and a press wheel for each furrow respectively, said press wheels being attached to the T-frames therebelow and rearwardly of the tools.

6. The invention of claim 5; mechanisms mounting the tool frames for up and down movement relative to T-frames; and manual means for each mechanism respectively for controlling said movements of the tool frames.

7. In a farm implement:
central frame means;
a pair of wing frames disposed on opposite sides of the central frame means,
each of said wing frames having ground-working tools and a ground-engaging support wheel; and
a four-bar linkage for each of said wing frames, respectively, coupling an inner end thereof to the central frame means for up-and-down hinging movement of the wing frames relative to one another and to the central frame means as the ground wheels encounter changes in ground contour, each of said linkages including vertically spaced upper and lower links pivotally coupled at one end to the central frame means and pivotally coupled at an opposite end to the corresponding wing frame, a pivotal coupling for one link of each linkage including lost motion means permitting the effective length of said one link to vary between a pair of opposite limits as ground contour changes are encountered by the wheels, thereby promoting flexibility of the implement.

8. In a farm implement as claimed in claim 7, said lost motion means for each linkage being associated with the lower link of the linkage.

9. In a farm implement as claimed in claim 8, said upper link of each linkage having a center line intersecting the pivotal couplings at its opposite ends and the lower link of each linkage having a center line intersecting the pivotal couplings at opposite ends of the lower link, said upper link of each linkage being longer than the lower link at both limits of lost motion of the lower link and said center lines of the upper and lower links of each linkage converging downwardly to an effective low pivot point for the corresponding wing frame.

10. In a farm implement as claimed in claim 8, said lost motion means for each linkage including a pin on the wing frame and a slot in the lower link.

11. In a farm implement as claimed in claim 10, said central frame means including a fore and aft extending tongue and a pair of elongated, upstanding pivot frames disposed on opposite sides of and normally parallel with the longitudinal axis of the tongue, said pivot frames each having a pivotal coupling with said tongue permitting the frames to swing rearwardly from said parallel position to a position disposed in end-to-end relationship projecting laterally outwardly from opposite sides of the tongue, said wing frames being coupled with said pivot frames whereby to dispose the wing frames in laterally outwardly projecting working positions when the pivot frames are parallel with the tongue and folded back, mutually parallel transport positions when the pivot frames are in end-to-end relationship with one another.

12. In a farm implement as claimed in claim 7, said central frame means including a fore and aft extending tongue and a pair of elongated, upstanding pivot frames disposed on opposite sides of and normally parallel with the longitudinal axis of the tongue, said pivot frames each having a pivotal coupling with said tongue permitting the frames to swing rearwardly from said parallel position to a position disposed in end-to-end relationship projecting laterally outwardly from opposite sides of the tongue, said wing frames being coupled with said pivot frames whereby to dispose the wing frames in laterally outwardly projecting working positions when the pivot frames are parallel with the tongue and folded back, mutually parallel transport positions when the pivot frames are in end-to-end relationship with one another.

13. In a seed planting implement:
central frame means;
a pair of wing frames disposed on opposite sides of the central frame means and pivotally coupled with the latter for horizontal swinging movement between laterally outwardly projecting working positions generally normal to the path of travel of the implement and folded back transport positions generally parallel with the path of travel of the implement, each of said wing frames having a ground-engaging wheel supporting the wing frame above the ground for movement along the latter;

a subframe below each of said wing frames, respectively, carried by the wing frames, each of said subframes having ground-opening means supported thereon for preparing the soil for seed placement and further having ground-closing means thereon in trailing relationship to said ground-opening means for firmly covering placed seeds with soil, said ground-closing means being disposed for engagement with the surface of the ground during penetration of the soil by said ground-opening means whereby to gauge the depth of penetration of said opening means;

an actuatable lift linkage assembly on each of said wing frames, respectively, operably coupled with the corresponding subframe for raising and lowering the subframe between a transport position in which the opening means and the closing means are lifted off the ground and a working position in which the opening means and the closing means are engaging the ground, each of said lift linkage assemblies including means for shifting the corresponding subframe forwardly as the subframe is being raised into its transport position and for retaining the raised subframe in a forwardly shifted condition while the same is in its transport position whereby to reduce the extent of rearward projection of the subframe and ground-closing means to facilitate disposition of the wing frames in their folded back transport positions without interference with one another, each of said subframes being vertically swingably coupled with its lift linkage assembly for accommodating changes in ground contour sensed by the ground closing means during stationary disposition of the lift linkage assembly relative to the corresponding wing frame, there being yieldable means interposed between each subframe and its lift linkage assembly for limited yieldable biasing of the subframe downwardly relative to the corresponding lift linkage assembly, each of said lift linkage assemblies including a four-bar linkage having a pair of vertically spaced upper and lower bars and a pair of horizontally spaced, front and rear bars, the rear bar of said linkage being fixed with respect to the corresponding wing frame and the other bars thereof being vertically swingable relative to the corresponding wing frame during actuation of the lift linkage assembly, the subframe associated with each lift linkage assembly being pivotally coupled with its lift linkage assembly at the joint between the forward bar of the four-bar linkage and the lower bar thereof, said upper and lower bars of each four-bar linkage being disposed in a generally upright orientation when the corresponding subframe is in its lowered, working position and being swingable generally upwardly and forwardly during actuation whereby to shift the subframe both upwardly and forwardly as the latter is moved into its transport position.

14. In a seed planting implement as claimed in claim 13, said yieldable means of each subframe extending between a pivot joint between the upper bar and front bar of the corresponding four bar linkage and the subframe.

* * * * *